C. F. WEEBER.
TIRE CARRIER.
APPLICATION FILED MAY 6, 1919.
1,404,815.
Patented Jan. 31, 1922.
2 SHEETS—SHEET 1.
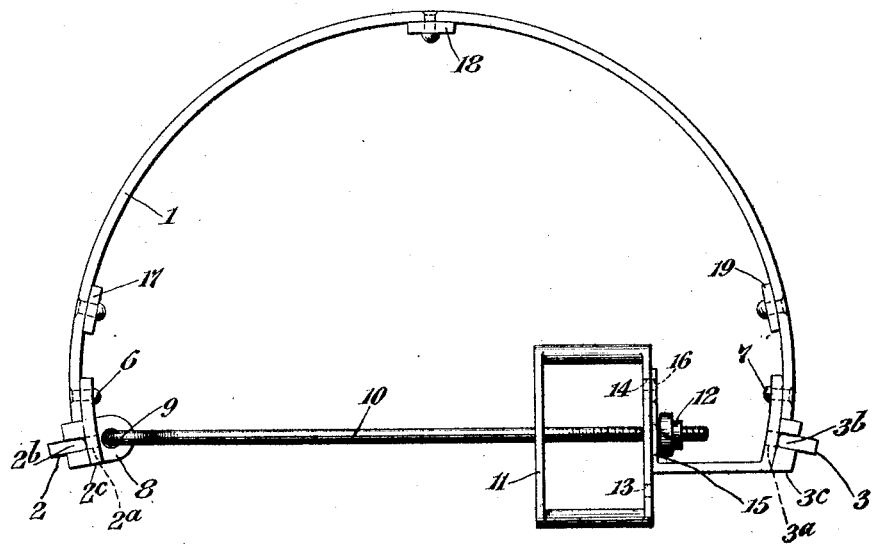
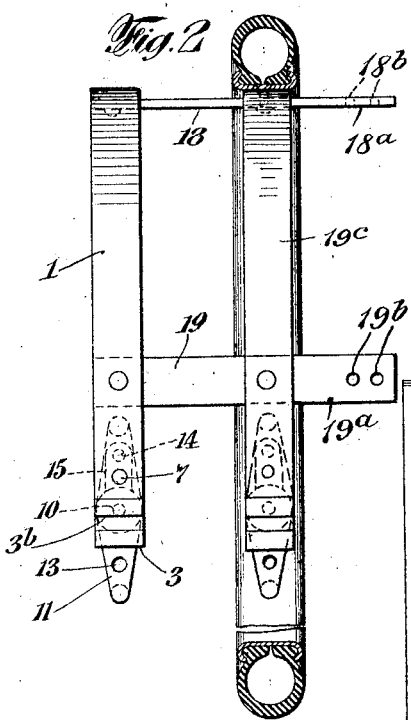
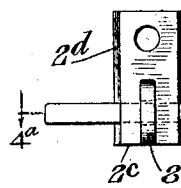
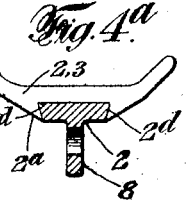
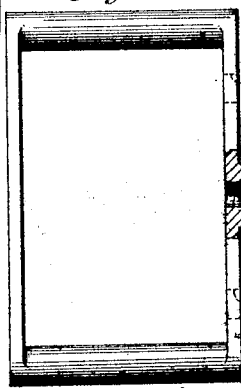
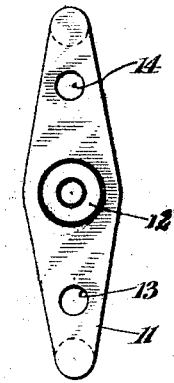
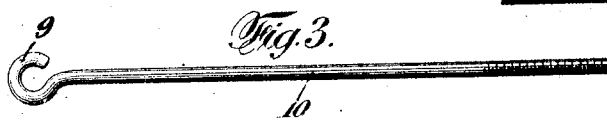
INVENTOR
Christian F. Weeber,
BY Prindle, Wright & Small
ATTORNEYS C. F. WEEBER.
TIRE CARRIER.
APPLICATION FILED MAY 6, 1919.
1,404,815.
Patented Jan. 31, 1922.
2 SHEETS—SHEET 2.
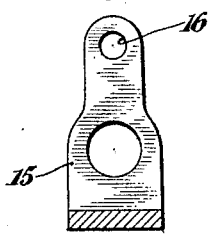
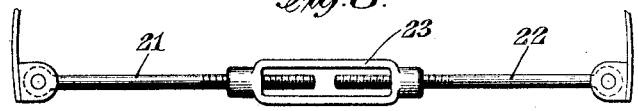
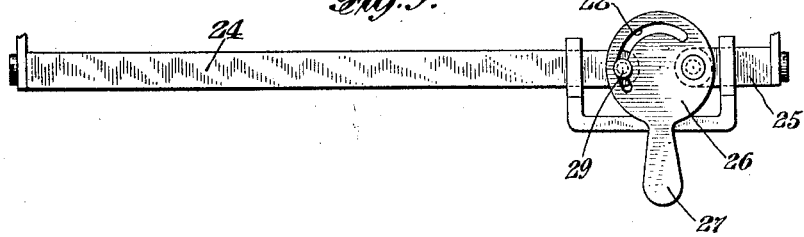
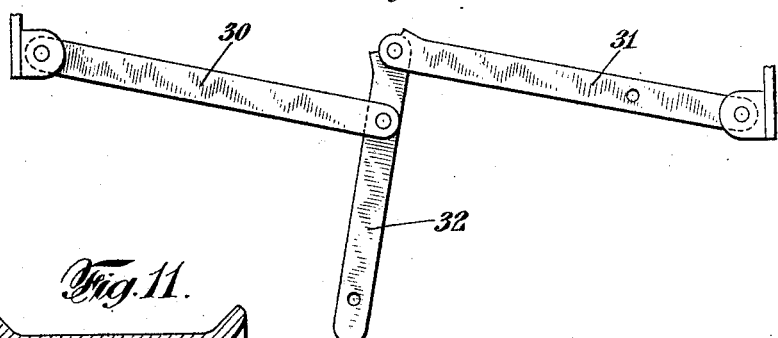
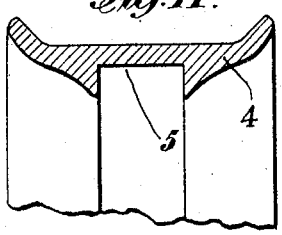
INVENTOR
Christian F. Weeber
BY
Prindle Wright & Small
ATTORNEYS

UNITED STATES PATENT OFFICE.

CHRISTIAN F. WEEBER, OF ALBANY, NEW YORK.

TIRE CARRIER.

1,404,815.   Specification of Letters Patent.   Patented Jan. 31, 1922.

Application filed May 6, 1919. Serial No. 295,174.

*To all whom it may concern:*

Be it known that I, CHRISTIAN F. WEEBER, a citizen of the United States, residing at Albany, in the county of Albany and State of New York, have invented a certain new and useful Improvement in Tire Carriers, of which the following is a specification.

My invention relates particularly to an apparatus to be used as a tire carrier.

The object of my invention is to provide a tire carrier of an advantageous type and which may be located at any suitable point but which is especially applicable for attachment to the rear of an automobile.

Another object of my invention is to provide a tire carrier which may be located at a point in the rear of one or more extra tires carried by the automobile in such a manner that the tire on the tire carrier may be removed when desired and the one or more extra tires located in advance of this tire carrier may also be readily removed.

Further objects of my invention are to provide a tire carrier which is rigidly fastened in position, which will firmly grip the tire carried by the same so as to exert a lateral and vertical pressure upon the rim carrying the tire, but which is made in the form of only a fragment of a circle to permit the ready removal of the several tires carried by the automobile, and which has means for locking said tires in place.

While my invention is capable of embodiment in many different forms, for the purpose of illustration I have shown only certain forms thereof in the accompanying drawings, in which;

Fig. 1 is a rear elevation of a tire carrier made in accordance with my invention, Fig. 2 is a side elevation of the same, as associated with another tire carrier, Fig. 3 is a plan view of the connecting rod for the two ends of the tire carrier, Fig. 4 is an elevation of a bracket to which the bolt is attached, Fig. 4ᵃ is a transverse section of the same taken on lines 4ᵃ—4ᵃ of Fig. 4, Fig. 5 is an elevation of the operating means resembling a turn buckle used therewith, Fig. 6 is a side elevation of the operating means resembling a turn buckle, Fig. 7 is a vertical section through the yoke used thereon, Fig. 8 is an elevation of a form of turn buckle which may be used instead, Fig. 9 is an elevation of a cam expansion device which may be used instead, Fig. 10 is an elevation of a toggle expanding device which may be used instead; and Fig. 11 is a fragmental section of one of the many different forms of tire rims adapted to be carried by the tire carrier.

In the drawings I have shown a tire carrier comprised of a flexible iron band 1 in the form of a fragment of a circle but which may constitute more than half of the circumference of said circle. At the two ends of the iron band 1 there are located blocks 2 and 3 which will fit any of the ordinary styles of rims upon which automobile tires are carried, and which have projections $2^a$ and $3^a$ respectively so that the blocks may fit in recesses $2^b$ and $3^b$ in castings $2^c$ and $3^c$ respectively at the two ends of the band 1 in such a manner that the projections $2^a$ and $3^a$ may be bent over bevelled edges $2^d$ and $3^d$ on the castings $2^c$ and $3^c$ respectively. In case a rim 4 as indicated in Fig. 11 is used, the blocks 2 and 3 will not be used but the projections on the castings $2^c$ and $3^c$ will fit in a recess 5 in said rim 4. These castings $2^c$ and $3^c$ may be held in place by rivets 6 and 7 respectively. The casting $2^c$ has an ear 8 which receives a hook 9 at one end of a rod 10, the other end of which is screw threaded and passes through an operating member 11 provided with a screw threaded neck 12 at one side thereof and lock holes 13 and 14 at the same side of the turn buckle. The neck 12 fits movably within one arm 15 of the casting $3^c$ which is in the form of a yoke. A collar or the like secured upon neck 12 (as best shown in Fig. 1) may be employed to cause a change in the transverse distance between the ends of the iron band by causing the yoke to advance or return, relatively to rod 10, in proportion as the operating member 11 may be advanced or returned as a consequence of its mentioned rotation in threaded engagement with 10. The arm 15 has a lock hole 16 adapted to receive a padlock simultaneously with one of the holes 13 and 14. In order to secure the carrier 1 in place rigid arms 17, 18 and 19 may be riveted thereto and extend towards the automobile or any other suitable support, as for example a tire support 19$^c$, similar to the support 1, to which they may be attached by rivets, bolts, or in any other manner, as indicated in Fig. 2.

In the form shown in Figure 2, the rigid arms, whether or not secured to the intermediate carrier removably by bolts in the manner just described have parts projecting beyond the support 19$^c$ and adapted to be bolted to the automobile frame or body. These parts are indicated as 18$^a$ and 19$^a$ and as having bolt holes 18$^b$ and 19$^b$ through which latter the fastening bolts may project. The two carrier construction shown in Figure 2 has proved particularly useful and convenient. The tire secured on the carrier 19$^c$ may be fastened in the same manner as that on the carrier 1 and may be removed beyond the carrier 1 with a degree of dispatch and ease not possible in tire carriers in which the outer member 1 is much more than half round. The quick adjustability of the carriers is due in part to the fact that the expansion member is positioned approximately across the center of the tire when mounted.

Fig. 8 shows a modified form of my invention, in which, instead of the bolt 10, operating device 11 and yoke 15, I have shown two screw threaded bolts 21 and 22 connected by a turn buckle 23 of the ordinary type. Again, in Fig. 9 I have shown another modified form of apparatus for this purpose comprising two rods 24 and 25 having a slotted yoke for receiving the ends of the same and between the arms of which there is a cam 26 having an operating handle 27 pivoted to the rod 25 and having a cam slot 28 cooperating with a pin 29 in the rod 24. Still another form of apparatus for this purpose may be made as shown in Fig. 10, the same comprising two pivoted rods 30 and 31 connected together by a hand lever 32, so as to act as a toggle.

In the operation of my invention, referring first to Figs. 1 to 7, the band 1 together with the support 19$^c$ carrying an additional tire is attached to the rear of an automobile. Said tire located on the band 1 will be retained in place by the pressure exerted laterally and vertically by the extension of the rod 10 brought about through the rotation of the operating member 11. The tire and its rim carried by the band 1 will be held in place in part by the blocks 2 and 3 or the projections which fit against the inner periphery of said rim. Furthermore in this position the tire will be locked in place as a padlock will be carried by the holes 16 and 14. Also, any change in angular position between the two ends of the band 1 will be compensated for by the presence of the yoke 3$^c$, the arms of which allow a sufficient movement to accomplish this end. Furthermore, it will be seen that any tires carried in advance of the band 1 will be secured in place by reason of the presence of the tire which is locked on the band 1. However, the tire on the band 1, as well as any tires located in advance thereof, may be removed when desired by removing the lock from the holes 16 and 14, rotating the turn buckle 11 in the left hand direction, and thus drawing together the two ends of the band 1 until the tire and its rim located on the band 1 are free from engagement therewith.

The modified forms of my invention shown in Figs. 8, 9 and 10 operate in the same manner as the form of my invention shown in the preceding figures, except that in Figs. 8, 9 and 10 the devices operate as a simple turn buckle, a cam and a toggle respectively and means is not shown in connection therewith for receiving a padlock.

While I have described my invention above in detail, I wish it to be understood that many changes may be made therein without departing from the spirit thereof.

I claim:

1. An expansible tire carrier comprising a band adapted to be removably supported exteriorly of another tire carrier and comprising also means for an independent reduction of said first mentioned tire carrier in size to permit not only the ready removal of a tire from said first mentioned tire carrier but also the optional removal of any tire carried by such other tire carrier, and means supporting said expansible tire carrier.

2. A tire carrier comprising a substantially semi-circular rim-engaging expansible frame having rim gripping terminal parts and supported at points sufficiently remote from said rim-gripping terminal parts to permit said terminal parts to approach one another along substantially the line of greatest diameter, means wholly above the said line of greatest diameter for detachably supporting said tire carrier, and means for altering the distance between said rim-gripping terminal parts.

3. An expansible tire carrier comprising a substantially semi-circular rim-engaging expansible frame having rim-gripping terminal parts and supported at points sufficiently remote from said rim - gripping parts to permit said terminal parts to approach one another along substantially the line of greatest diameter, said tire carrier being adapted to be removably supported exteriorly of another tire carrier and adapted by independent contraction to permit not only the ready removal of a tire therefrom but also the optional removal of any tire carried by said other tire carrier, means for altering the distance between said rim-gripping terminal parts and means for detachably supporting said expansible tire carrier wholly above said line of greatest diameter.

4. A tire carrier comprising a primary carrier member, a secondary carrier member substantially parallel to said primary carrier member, means for mounting said secondary member, said secondary member comprising a curved receiving band member in the form of approximately one-half of a circle, and locking means for spreading and contracting the ends of said receiving band member, said locking means comprising a screw-threaded rod having one end connected to one end of said band and operating means connected to the other end of said band, said locking means extending substantially across the axial center of said secondary carrier.

5. A tire carrier comprising a primary carrier member, a secondary carrier member substantially parallel to said primary carrier member, means for mounting said secondary carrier member comprising a plurality of arms extending in substantially parallel relation from said primary carrier member to said secondary carrier member and on the inner side of said carriers, all of said substantially parallel arms being on the upper side of a line drawn horizontally through the axial center, and locking means for spreading and contracting the ends of said secondary carrier member, said secondary member comprising a curved receiving band member in the form of approximately one-half of a circle.

6. A tire carrier comprising an expanding fixture adapted to be received within the inner periphery of a tire, and means for expanding the fixture, said means comprising a rod secured to one end of said fixture, a substantially U-shaped yoke having one arm of the U secured to the other end of said fixture, and operating means engaging said rod and the other arm of said U-shaped yoke.

7. A tire carrier comprising an expanding fixture adapted to be received within the inner periphery of a tire and made of a flexible band, and means for expanding the fixture, said means comprising a rod secured to one end of said fixture, a U-shaped yoke having one arm of the U secured to the other end of said fixture, the second arm of the U having an opening therein, and operating means engaging said rod and said yoke and having an extension projecting into and journalled in said opening in the second arm of said U-shaped yoke.

8. A tire carrier comprising an expanding fixture adapted to be received within the inner periphery of a tire and made of a flexible band in the form of a broken circle amounting to slightly more than half of a circumference, and means for expanding the fixture, said means comprising a rod secured to one end of said fixture, a substantially U-shaped yoke having one arm of the U secured to the other end of said fixture, and operating means engaging said rod and the other arm of said U-shaped yoke.

9. A tire carrier comprising an expanding fixture adapted to be received within the inner periphery of a tire, said fixture including a flexible band having rim receiving projections, and removable blocks on said projections for positioning the rim on said band.

10. A tire carrier comprising an expanding fixture adapted to be received within the inner periphery of a tire, said fixture including a flexible band having rim receiving projections, and having removable blocks thereon for positioning a rim on said band, said band being in the form of a broken circle amounting to approximately half of a circumference.

In testimony that I claim the foregoing, I have hereunto set my hand this 18th day of April, 1919.

CHRISTIAN F. WEEBER.